July 12, 1932. J. W. CRIGLER 1,867,252
ROACH TRAP
Filed March 26, 1931
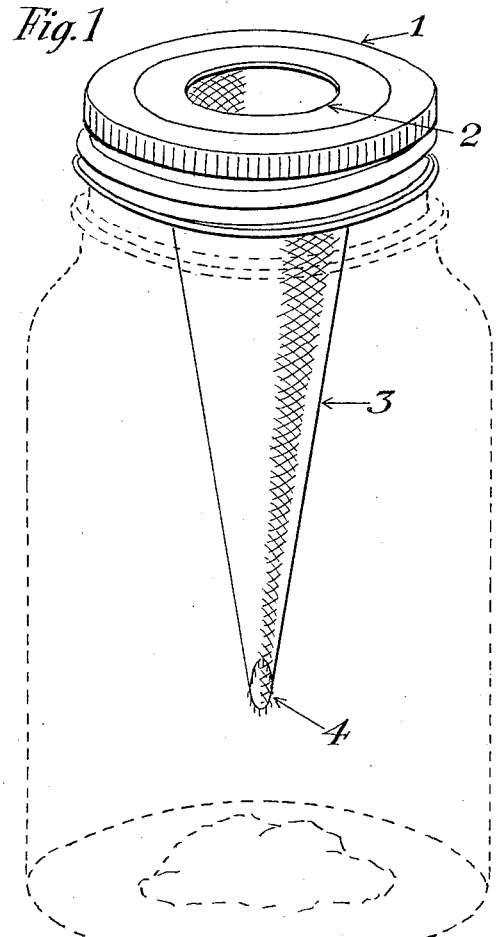
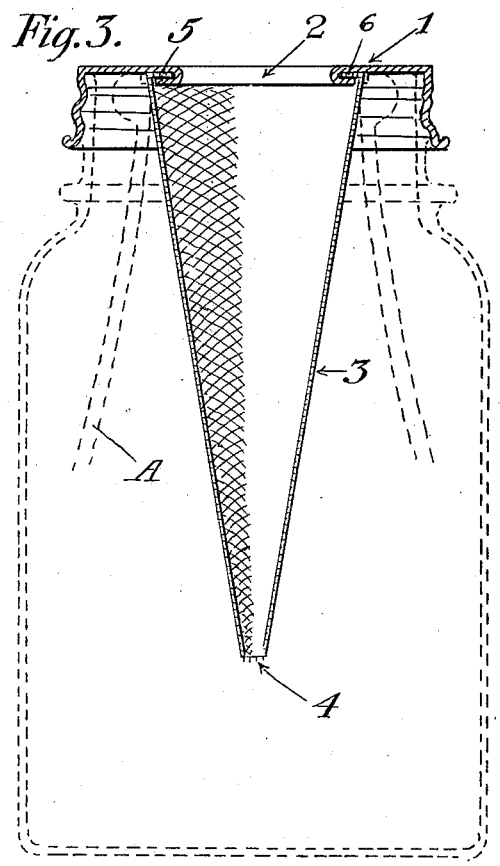
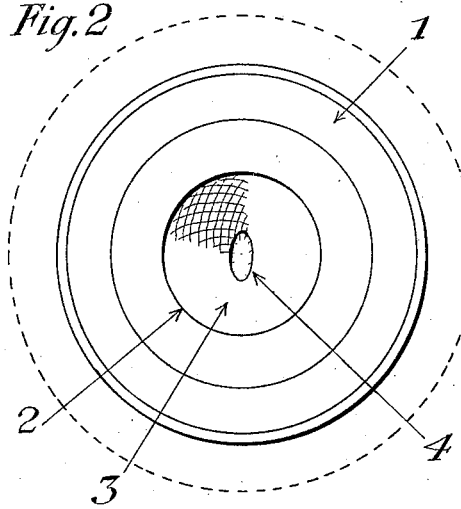
James W. Crigler
INVENTOR
BY C. A. Snow & Co.
ATTORNEYS.

Patented July 12, 1932

1,867,252

UNITED STATES PATENT OFFICE

JAMES W. CRIGLER, OF MISSISSIPPI CITY, MISSISSIPPI

ROACH TRAP

Application filed March 26, 1931. Serial No. 525,498.

This invention relates to insect traps, and aims to provide a trap of a novel construction, which may be used in connection with fruit jars of known construction, and may be readily positioned on a fruit jar in lieu of the usual screw cap thereof.

An important object of the invention is the provision of an inverted frusto-conical member, and a cap to which the frusto-conical member is secured, for supporting the frusto-conical member within the jar, and in spaced relation with the bottom of the jar.

Another object of the invention is to construct the frusto-conical member in such a way that the ends of the wires of which the frusto-conical member is formed, will extend beyond the outlet end of the frusto-conical member, to guard the end against roaches or insects, endeavoring to escape through the frusto-conical member.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a perspective view of a device constructed in accordance with the invention, the jar being shown in dotted lines.

Figure 2 is a plan view of the trap.

Figure 3 is a longitudinal sectional view through the trap, and showing a milk bottle in dotted lines, for supporting the trap.

Referring to the drawing in detail, the reference character 1 designates a cap similar to the usual fruit jar cap, the same being provided with threads so that it may be positioned over the upper threaded mouth of a fruit jar.

The cap 1 is provided with an opening 2 that establishes communication between the frusto-conical member 3 and the atmosphere, the frusto-conical member 3 being shown as inverted. This frusto-conical member 3 is formed of wire mesh material, the wires extending beyond the open lower end of the trap, as at 4, to guard the open end against insects such as roaches, passing through the inner open end of the trap.

As clearly shown by Figure 3 of the drawing, a portion of the cap 1 is extended inwardly as at 5, where it is disposed in spaced relation with the body portion of the cap, to accommodate the inwardly extended annular flange 6, formed at the upper end of the frusto-conical member 3, to secure the frusto-conical member 3 in position on the cap.

The opening in the inner end of the frusto-conical member is oval in formation, so that the escape of the insects through the opening, will be difficult.

While I have shown a fruit jar in dotted lines, and with which the trap is used, it is to be understood that the trap may be employed by inserting it in the mouth of a milk bottle, a milk bottle being shown in dotted lines, and indicated by the reference letter A.

In the use of the device, it is contemplated to place a suitable bait within the trap to attract the insects to the trap.

When it is desired to remove the insects from the trap, hot water is poured into the trap, to kill the insects, whereupon the cover may be removed, allowing the water and insects to be poured therefrom and the trap reset.

I claim:

An insect trap comprising a body portion, a frusto-conical member, a removable cover for the body portion, said removable cover having an opening and having a downwardly and outwardly extended portion spaced from the cover, an inwardly extended flange formed on the frusto-conical member and held between the inturned portion of the cover and the cover, to secure the frusto-conical member in position, and said frusto-conical member being constructed of wire mesh material.

In testimony that I claim the foregoing as my own, I have hereto affixed my signature.

JAMES W. CRIGLER.